Patented Mar. 11, 1952

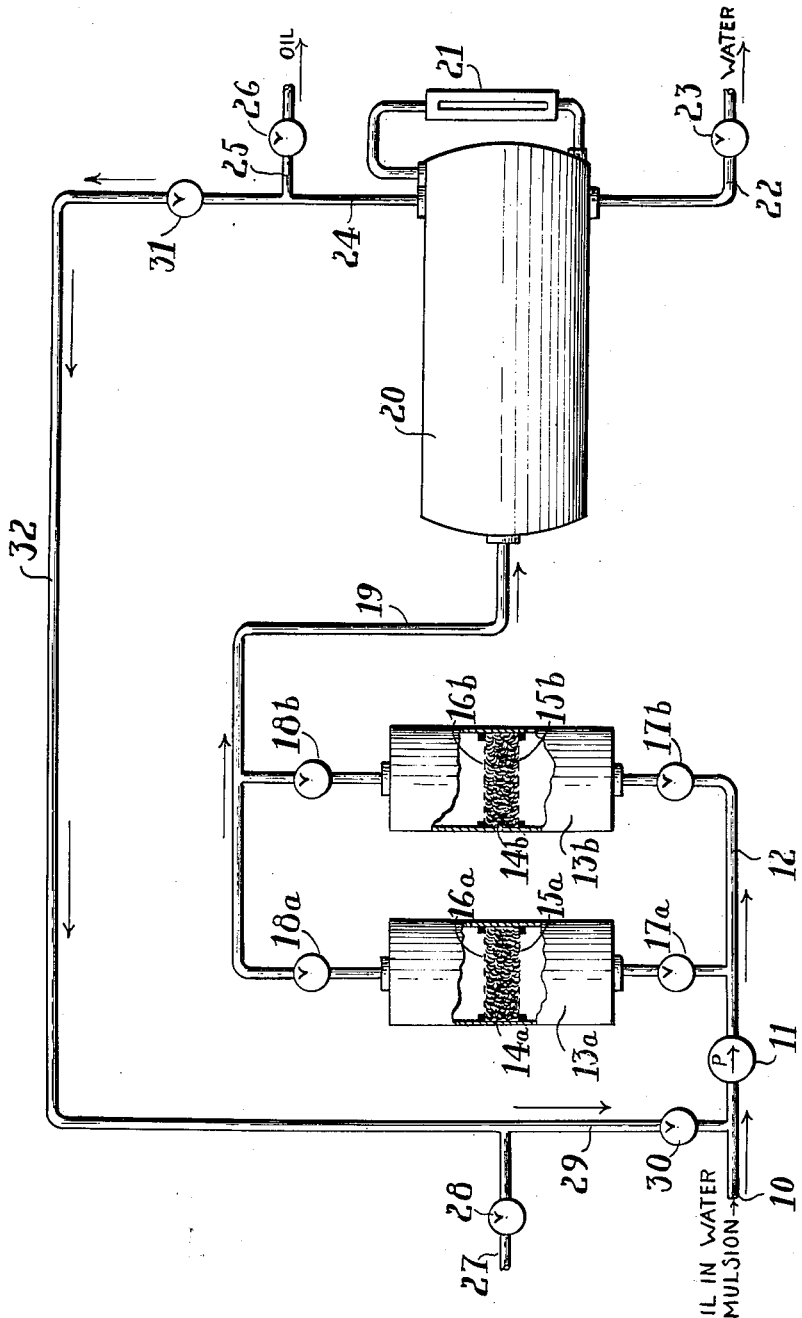

2,588,794

UNITED STATES PATENT OFFICE 2,588,794

METHOD OF SEPARATING OIL FROM WATER

Paul D. Barton, Phoenixville, Pa., assignor to Sun Oil Company, Philadelphia, Pa., a corporation of New Jersey Application July 25, 1946, Serial No. 686,109

6 Claims. (Cl. 210—2)

This invention relates to an improved method for separating oil from an oil-in-water suspension or emulsion. The invention is especially useful for removing the oil from an oil-in-water suspension containing a relatively minute amount of oil in finely dispersed form.

In various industrial operations efflux streams are obtained which comprise water containing a relatively minute amount of oil in finely dispersed form. Particularly are such oil-in-water dispersions or emulsions encountered in petroleum refining operations, wherein they are often produced in such large amounts as to present a considerable problem of disposal. Government regulations often specify that efflux waters which are to be disposed of by flowing into rivers or streams should not contain over a certain maximum amount of oil, and it has proved difficult in many cases to meet such requirements. It has been customary practice to pass the oil-containing water through a gravity separation system in order to remove as much of the dispersed oil as will readily separate by subsidence, but in many cases this procedure has proved ineffective due to the stability of the emulsion. For example, it is not uncommon that the water flowing from a gravity separation system contain say 50–200 p. p. m. of oil whereas it may be desirable or necessary that the water have an oil content less than say 15 p. p. m. Removal of the oil in such cases without incurring excessive costs has heretofore presented a difficult problem to the oil refiner.

The present invention provides an improved method for removing oil from oil-in-water emulsions of the above discussed type whereby such removal may be accomplished in an efficient and economical manner. According to the invention the method comprises flowing the emulsion through a bed of glass wool to effect intimate contact between the mixture and the glass wool and maintaining the rate of flow sufficiently low to cause coalescence of the dispersed oil particles and the formation of particles of larger size. The thus treated mixture is then permitted to separate by gravitation into an oil layer and a water layer which are withdrawn separately from the system.

In a more specific embodiment of the invention a still further improvement is attained by first mixing the charge emulsion with a minor amount of a solvent oil. The mixture is then passed through a bed of glass wool at sufficiently low rate to effect a coalescence of dispersed oil particles, the resulting mixture is allowed to separate by gravitation into an oil layer and a water layer and the separate layers are withdrawn. If desired, part of the resulting oil layer may be used as the aforesaid solvent oil and recycled in the system.

The accompanying drawing is a diagrammatic illustration of one arrangement of apparatus for practicing the invention.

In the drawing the charge emulsion enters the system through line 10 and is fed by means of pump 11 and line 12 to one of two contact zones or tanks 13-a and 13-b. Each of these tanks contains a bed of glass wool, shown as 14-a and 14-b, through which the charge emulsion must pass. Each bed may be supported and held in place by means of perforated plates or screens positioned below (15-a and 15-b) and above (16-a and 16-b) the bed. The plates or screens preferably are so fixed within the tank as to be readily removable in case it becomes necessary to replace a bed of glass wool with fresh material. Tanks 13-a and 13-b are arranged so that they may be used alternatively, the flow being controlled thereto as desired by means of inlet valves 17-a and 17-b and outlet valves 18-a and 18-b. Thus, for example, tank 13-b may be used while tank 13-a is held out of operation by opening valves 17-b and 18-b and closing valves 17-a and 18-a. In case the bed of glass wool in tank 13-a has become contaminated during use due to dirt or other solid matter in the charge emulsion, it may then be replaced by fresh material. In order to do this, of course, it is necessary that the tanks be supplied with means (not shown) for drainage and with suitable openings for access to the bed. It is also desirable to provide suitable means whereby a used bed contaminated with dirt or other solid matter may be backwashed with water to flush out the dirt. In this manner the necessity for frequent replacement of the glass wool may be obviated.

The function of the bed of glass wool is to cause a coalescence of the dispersed oil particles as the charge material passes therethrough. It has been found that the extent to which this effect is achieved is dependent upon certain factors. One especially important factor is the diameter of the glass fibers used. It has been found that the glass wool should have a fiber diameter less than 0.001 inch. Another important factor is the rate of flow through the contact zone. The maximum permissible rate of flow may vary considerably dependent upon the particular charge material being treated. As a general rule, the superficial velocity through the contact zone (i. e. the velocity calculated as if the contact zone contained no contact material) should be maintained less than 3 feet per minute and in some cases even less than 0.5 foot per minute. In any case it is important that the rate be maintained sufficiently low to effect a coalescence of the dispersed oil particles so that the resulting mixture subsequently may be separated readily into an oil layer and a water layer.

Another factor upon which the effectiveness of the contacting operation depends to an extent is the compactness of the bed of glass wool. The effectiveness generally improves as the compactness is increased, until a point is reached at which no substantial further improvement is obtained. The thickness of the bed need not be more than say two inches for obtaining good results. In fact, if the bed is too thick, the pressure required to maintain a desired rate of flow will be excessive and will tend to crush the bed and still further impede flow.

An increase in temperature generally will aid in improving the effectiveness of the treatment.

From the contacting zone the treated mixture is passed through line 19 to a settling zone shown as settling tank 20. Therein the mixture is permitted to settle into an upper oil layer and a lower water layer. A level gauge 21 is provided to indicate the level of the interface between the layers. Water may be continuously or intermittently withdrawn from the settler through line 22 and valve 23. Oil may be withdrawn from the top through line 24 and may be removed from the system through line 25 and valve 26.

For a more complete removal of oil from the charge emulsion, means are provided for adding a minor amount of a solvent oil to the charge prior to its introduction into the contacting zone. For this purpose oil may be introduced from an outside source, if desired, through line 27 containing valve 28, thence through line 29 and valve 30, into the charge emulsion. Pump 11 may be of a type such as to effect an intimate mixing of the solvent oil and the charge emulsion. The solvent oil may be any oil which has substantially no tendency to form a stable emulsion with water, such as naphtha, kerosene, gas oil, etc. Other organic solvents having such characteristic could be used in place of oil if desired, although the cost generally would be prohibitive.

Once an oil layer has been obtained in settler 20, it is preferred to utilize the oil thus recovered as the solvent oil rather than to introduce other oil into the system. This may be done by continuously recycling a portion of the oil layer through valve 31 and line 32 into charge inlet line 10. When the operation is carried out in this manner, no other oil need be added. The oil obtained in excess of that required in the circulatory system may be drawn off through line 25 and valve 26.

The following examples are illustrative of results which may be obtained in practicing the invention.

*Example I*

The emulsion to be treated was obtained from a catalytic cracking plant operation of the fixed bed type. More particularly, it was the water layer resulting from condensation of the steam used in purging oil vapors from the catalytic cracking chambers and subsequent gravity separation of the condensate from unemulsified oil. This material was a stable oil-in-water dispersion having an oil content of 78 p. p. m. It was fed, without addition of any solvent oil, to a contact zone containing a bed of glass wool having a fiber diameter of 0.00028 inch, the bed being about 1.5 inches thick. A temperature of about 150° F. was maintained in the zone and the rate of flow was such that the calculated superficial velocity was 0.50 ft./min. The treated mixture was passed into a settler wherein it was permitted to separate into an oil layer and a water layer. The water layer was found to have an oil content of 30 p. p. m. The method thus effected removal of approximately 62% of the oil originally present in the charge.

*Example II*

Another emulsion derived from the same source as in Example I was treated in a similar manner except that a solvent oil was added before treatment of the emulsion. The solvent oil, which was a naphtha fraction having a boiling range of about 300–400° F., was used in the proportion of 6 volumes of solvent oil to 100 volumes of emulsion. A superficial velocity of 0.34 ft./min. was maintained, otherwise, the conditions were as described in Example I. The resulting water layer had an oil content of 5 p. p. m., showing that about 95% of the oil was removed.

*Example III*

In a further run in which another emulsion of the same type was treated in similar manner using 8.3 volumes of the naphtha fraction for each 100 volumes of emulsion and a superficial velocity of 0.51 ft./min., the oil content was reduced from 71 p. p. m. to 2 p. p. m. In other words, about 97% of the oil was removed.

*Example IV*

In this example the starting emulsion was obtained from the same source as in previous examples and had an oil content of 80 p. p. m. A solvent oil was used which was substantially the same as the oil comprising the dispersed phase of the emulsion. The solvent oil was mixed with the emulsion in the proportion of 6.1:100 and the mixture was fed to the contacting zone at a temperature of about 100° F. The superficial velocity in the contacting zone was maintained at 0.53 ft./min. The water layer obtained upon settling the treated mixture had an oil content of 8 p. p. m. Thus the operation effected the removal of about 90% of the oil from the emulsion.

It is to be understood that the present invention is not concerned with the treatment of water-in-oil emulsions or suspensions but only with those of the oil-in-water type as herein described. While the treatment of emulsions with a contact material for the purpose of effecting separation of phases is broadly old, it has heretofore been considered necessary to use a contact material which is preferentially wetted by the dispersed phase of the emulsion. Thus, since glass wool is known to be preferentially wetted by water in the presence of oil, this material heretofore would not have been considered suitable for treating emulsions of the oil-in-water type. Regardless of the preferential wetting characteristics of the glass wool, I have found that a most efficient separation of oil-in-water emulsions may be achieved by means of this material provided it is employed in the manner and under the conditions herein set forth.

The separation of dilute oil-in-water emulsions according to the present method may be carried out by using other contact materials having physical characteristics similar to glass wool. Thus, other fibrous materials which have sufficiently small fiber diameter and also the ability to withstand a reasonable amount of pressure differential through the bed without compressing and matting to such extent as to impede flow to an impractical degree, may also be used. A contact material will be entirely satisfactory with respect to this latter requirement if the material is capable of operating at a pressure drop, for example, in the order of 5 pounds per square inch per inch of bed thickness. Where the fibrous material does not have the ability to withstand a reasonable pressure differential through the bed, the bed will compress or collapse thus rendering it impossible to maintain a practical rate of flow and still have a pressure differential as low as the aforesaid value. It has further been found that the contact material does not necessarily have to be fibrous but may have a honeycomb or sponge-like form, provided the void spaces are of a size comparable to the interstices of a bed of glass wool of suitable fiber size. Thus, cellulose sponge, a commercially available cellulose product, will also serve as an effective contact material according to the present method. However, it is distinctly preferred to use glass wool, as the characteristics of this material render it especially suitable for the present purpose.

Having described my invention, what I claim and desire to protect by Letters Patent is:

1. Method of removing oil from an oil-in-water suspension containing a relatively minute amount, less than 200 p. p. m., of petroleum distillate oil in finely dispersed form which comprises introducing said suspension into a bed of glass wool having a fiber diameter less than 0.001 inch, passing the mixture through said bed and in intimate contact with the glass wool, maintaining the rate of flow sufficiently low to effect a coalescence of the dispersed oil particles, permitting the thus treated mixture to separate by gravitation into an oil layer and a water layer and withdrawing the separate layers.

2. Method of removing oil from an oil-in-water suspension containing a relatively minute amount, less than 200 p. p. m., of petroleum distillate oil in finely dispersed form which comprises introducing said suspension into a bed of glass wool having a fiber diameter less than 0.001 inch, passing the mixture through said bed and in intimate contact with the glass wool, maintaining the rate of flow such that the superficial velocity is less than 3 feet per minute and sufficiently low to effect a coalescence of the dispersed oil particles, permitting the thus treated mixture to separate by gravitation into an oil layer and a water layer and withdrawing the separate layers.

3. Method of removing oil from an oil-in-water suspension containing a relatively minute amount, less than 200 p. p. m., of petroleum distillate oil in finely dispersed form which comprises mixing said suspension with a minor amount of solvent oil hereinafter specified, introducing the mixture into a bed of glass wool having a fiber diameter less than 0.001 inch, passing the mixture through said bed and in intimate contact with the glass wool, maintaining the rate of flow sufficiently low to effect a coalescence of dispersed oil particles, permitting the thus treated mixture to separate by gravitation into an oil layer and a water layer, withdrawing the separate layers and continuously recycling oil from said oil layer without the addition of other oil as the aforesaid solvent oil.

4. Method of removing oil from an oil-in-water suspension containing a relatively minute amount, less than 200 p. p. m., of petroleum distillate oil in finely dispersed form which comprises mixing said suspension with a minor amount of solvent oil hereinafter specified, introducing the mixture into a contact zone containing a bed of glass wool having a fiber diameter less than 0.001 inch, passing the mixture through said zone and in intimate contact with the glass wool, maintaining the rate of flow through said zone such that the superficial velocity is less than 3 feet per minute and sufficiently low to effect a coalescence of dispersed oil particles, introducing the thus treated mixture into a separation zone and therein permitting the mixture to separate by gravitation into an oil layer and a water layer, withdrawing the layers as separate streams from the separation zone and continuously recycling oil from said oil layer without the addition of other oil as the aforesaid solvent oil.

5. Method according to claim 1 wherein the fiber diameter is within a range of about 0.00028 inch to about 0.00085 inch.

6. Method according to claim 2 wherein the fiber diameter is within a range of about 0.00028 inch to about 0.00085 inch.

PAUL D. BARTON.

REFERENCES CITED

The following references are of record in the file of this patent:

UNITED STATES PATENTS

| Number | Name | Date |
|---|---|---|
| 1,547,712 | Zoul | July 28, 1925 |
| 1,847,413 | Pollock | Mar. 1, 1932 |
| 1,873,597 | Jones | Aug. 23, 1932 |
| 1,920,565 | Jones | Aug. 1, 1933 |
| 1,947,709 | Garrison et al. | Feb. 20, 1934 |
| 1,984,003 | Welsh | Dec. 11, 1934 |
| 2,224,624 | Adams et al. | Dec. 10, 1940 |
| 2,494,392 | Kirkbride et al. | Jan. 10, 1950 |

FOREIGN PATENTS

| Number | Country | Date |
|---|---|---|
| 265,674 | Great Britain | Feb. 9, 1927 |

OTHER REFERENCES

Fiberglas Standards, pamphlet No. D1.2.1, dated June 1, 1944, published by Owens-Corning Fiberglas Corporation.